United States Patent
Lu et al.

(10) Patent No.: US 9,172,410 B2
(45) Date of Patent: Oct. 27, 2015

(54) TRANSMITTER HAVING INTEGRATED DESIGN OF MULTIPLE WIRELESS COMMUNICATION MODULES

(71) Applicant: MEDIATEK INC., Hsin-Chu (TW)

(72) Inventors: Chao-Hsin Lu, Hsinchu County (TW); Chih-Jung Chen, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 87 days.

(21) Appl. No.: 14/156,308

(22) Filed: Jan. 15, 2014

(65) Prior Publication Data

US 2015/0200693 A1 Jul. 16, 2015

(51) Int. Cl.
*H01Q 11/12* (2006.01)
*H04B 1/04* (2006.01)

(52) U.S. Cl.
CPC ...... *H04B 1/0483* (2013.01); *H04B 2001/0491* (2013.01)

(58) Field of Classification Search
USPC ............ 455/102, 103, 127.4, 91; 375/295; 370/310
See application file for complete search history.

(56) References Cited

U.S. PATENT DOCUMENTS

| 6,532,249 | B1 * | 3/2003 | Hwang | 375/130 |
| 2007/0184803 | A1 | 8/2007 | Aytur | |
| 2011/0122972 | A1 | 5/2011 | Lie | |
| 2011/0299441 | A1 * | 12/2011 | Petrovic | 370/310 |
| 2013/0223573 | A1 | 8/2013 | Walley | |
| 2015/0036725 | A1 * | 2/2015 | Chen | 375/219 |

* cited by examiner

*Primary Examiner* — Nguyen Vo
(74) *Attorney, Agent, or Firm* — Winston Hsu; Scott Margo

(57) ABSTRACT

A transmitter includes a first wireless communication module, a second wireless communication module, a multiplexer, a digital-to-analog converter and a filter. The multiplexer selectively outputs a first digital signal derived from a digital output of the first wireless communication module or a second digital signal derived from a digital output of the second wireless communication module as a selected output. The digital-to-analog converter converts the selected output into an analog signal. The filter processes the analog signal and includes an adjustable resistive element. When the multiplexer selects the first digital signal as the selected output, the adjustable resistive element is adjusted to have a first resistance value such that the filter has a first bandwidth. When the multiplexer selects the second digital signal as the selected output, the adjustable resistive element is adjusted to have a second resistance value such that the filter has a second bandwidth.

15 Claims, 4 Drawing Sheets

TRANSMITTER HAVING INTEGRATED DESIGN OF MULTIPLE WIRELESS COMMUNICATION MODULES

BACKGROUND

The disclosed embodiments of the present invention relate to a transmitter, and more particularly, to a transmitter having an integrated design of multiple wireless communication modules.

Wireless communication technologies, such as Bluetooth (BT) and WiFi, are commonly applied to smart phones, tablets and personal computers. BT is a wireless technology standard for exchanging data over short distances from fixed and mobile devices, and has high levels of security. It can connect several devices at the same time, thereby overcoming problems of synchronization. WiFi is a technology allowing an electronic device to exchange data or connect to the internet wirelessly using radio waves. Many devices can use Wi-Fi, such as personal computers, video-game consoles, smartphones, digital cameras, and digital audio players.

Due to the trend of increasingly slim handheld devices such as smart phones and tablets, when both the WiFi and BT modules are applied, the overall volume of handheld devices becomes too large to be acceptable to consumers, as well as increasing the overall cost. Since the transmission bandwidth and bit number of WiFi and BT are different, how to integrate WiFi and BT functions in a single structure becomes a difficult issue.

SUMMARY

In accordance with exemplary embodiments of the present invention, a transmitter having an integrated design of multiple wireless communication modules is proposed to solve the above-mentioned problem.

According to a first aspect of the present invention, a transmitter is disclosed. The transmitter comprises a first wireless communication module, a second wireless communication module, a multiplexer, a digital-to-analog converter (DAC) and a filter. The multiplexer is arranged for selectively outputting a first digital signal derived from a digital output of the first wireless communication module or a second digital signal derived from a digital output of the second wireless communication module as a selected output. The DAC is coupled to the multiplexer for converting the selected output into an analog signal. The filter is coupled to the DAC for processing the analog signal and comprises an adjustable resistive element. When the multiplexer selects the first digital signal as the selected output, the adjustable resistive element is adjusted to have a first resistance value such that the filter has a first bandwidth. When the multiplexer selects the second digital signal as the selected output, the adjustable resistive element is adjusted to have a second resistance value such that the filter has a second bandwidth.

According to a second aspect of the present invention, a method for operating a transmitter is disclosed. The transmitter has a first wireless communication module and a second wireless communication module. The method comprises: selectively outputting a first digital signal derived from a digital output of the first wireless communication module or a second digital signal derived from a digital output of the second wireless communication module as a selected output; performing a digital-to-analog conversion upon the selected output to generate an analog signal; and configuring an adjustable resistive element in a filter, and utilizing the filter to process the analog signal, wherein when the selected output is the first digital signal, the adjustable resistive element is adjusted to have a first resistance value such that the filter has a first bandwidth, and when the selected output is the second digital signal, the adjustable resistive element is adjusted to have a second resistance value such that the filter has a second bandwidth.

According to a third aspect of the present invention, a transmitter is disclosed. The transmitter includes a first wireless communication module, a second wireless communication module comprising a mapping unit, a multiplexer, a DAC and a filter. The multiplexer is arranged for selectively outputting a first digital signal derived from a digital output of the first wireless communication module or a second digital signal derived from a digital output of the mapping unit of the second wireless communication module as a selected output. The DAC is coupled to the multiplexer, and arranged for converting the selected output into an analog signal. The filter is coupled to the DAC, and arranged to process the analog signal and a bandwidth of the filter is adjusted according to the selected output.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
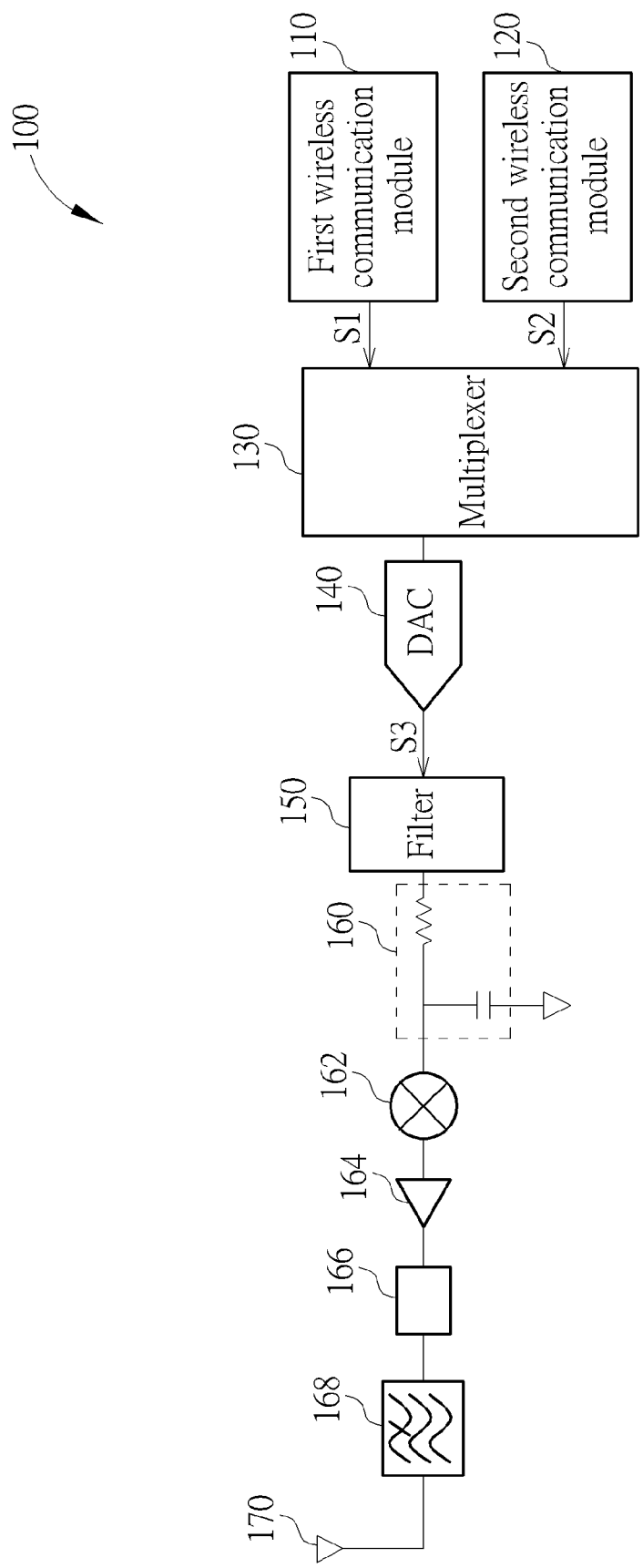
FIG. 1 is a block diagram illustrating a transmitter according to a first embodiment of the present invention.

Please refer to FIG. 1, which is a block diagram illustrating a transmitter 100 according to a first embodiment of the present invention. The transmitter 100 includes a first wireless communication module 110, a second wireless communication module 120, a multiplexer 130, a digital-to-analog converter (DAC) 140, a first filter 150, a low pass filter (LPF) 160, a mixer 162, a power amplifier 164, an output matching circuit 166, a second filter 168 and an antenna 170. The first wireless communication module 110 can be a Bluetooth (BT) module, and the second wireless communication module 120 can be a wireless fidelity (WiFi) module. Please note that, although the following embodiments of the present invention may focus on the WiFi and Bluetooth modules, the claimed scope of the present invention is not limited to these two. The first wireless communication module 110 and the second wireless communication module 120 can be replaced with various kinds of wireless communication modules. Further, the first wireless communication module 110 and the second wireless communication module 120 can be operated in a 2.4 GHz Industrial Scientific Medical (ISM) band. The DAC 140 can be a current DAC, for transmitting a current signal into a voltage signal.

The multiplexer 130 is arranged for selectively outputting a first digital signal S1 derived from a digital output of the first wireless communication module 110 or a second digital signal S2 derived from a digital output of the second wireless communication module 120 as a selected output. The DAC 140 is coupled to the multiplexer 130 for converting the digital signal of the selected output into an analog signal S3. The first filter 150 is coupled to the DAC 140 for processing the analog signal S3. The first filter 150 is configured to include an adjustable resistive element. When the multiplexer 130 selects the output S1 of the first wireless communication module 110 as the selected output, the adjustable resistive element is adjusted to have a first resistance value such that the first filter 150 has a first bandwidth. When the multiplexer 130 selects the output S2 of the second wireless communication module 120 as the selected output, the adjustable resistive element is adjusted to have a second resistance value such that the first filter 150 has a second bandwidth. The LPF 160 is used to filter noise, and the antenna 170 is used to transmit signals.

In this embodiment, if the bandwidth of the first signal S1 is smaller than the bandwidth of the second signal S2, the first resistance value will be adjusted to be larger than the second resistance value. Otherwise, if the bandwidth of the first signal S1 is larger than the bandwidth of the second signal S2, the first resistance value will be adjusted to be smaller than the second resistance value.

The digital output S1 of the first wireless communication module 110 is an N-bit digital sample, and the digital output S2 of the second wireless communication module 120 is an M-bit digital sample, and N and M can be different positive integers. In the present invention, the transmitter 100 is shared by the first wireless communication module 110 and the second wireless communication module 120 through utilizing the multiplexer 130 to select one of the first wireless communication module 110 and the second wireless communication module 120 as the output source. In the related arts, a transmitter having both BT and WiFi function requires two independent circuitries (i.e. two independent DACs and two independent filters). Hence, the total area of the transmitter 100 of the present invention can be reduced with respect to the related art. In general, to combine two transmitter intermediate frequency (TX IF) circuitries, the difficulties rise from that two DACs are with different bit numbers (different resolutions) and two filters are with different bandwidth. Through utilizing this embodiment, the above combination can be achieved.

Figure 2:
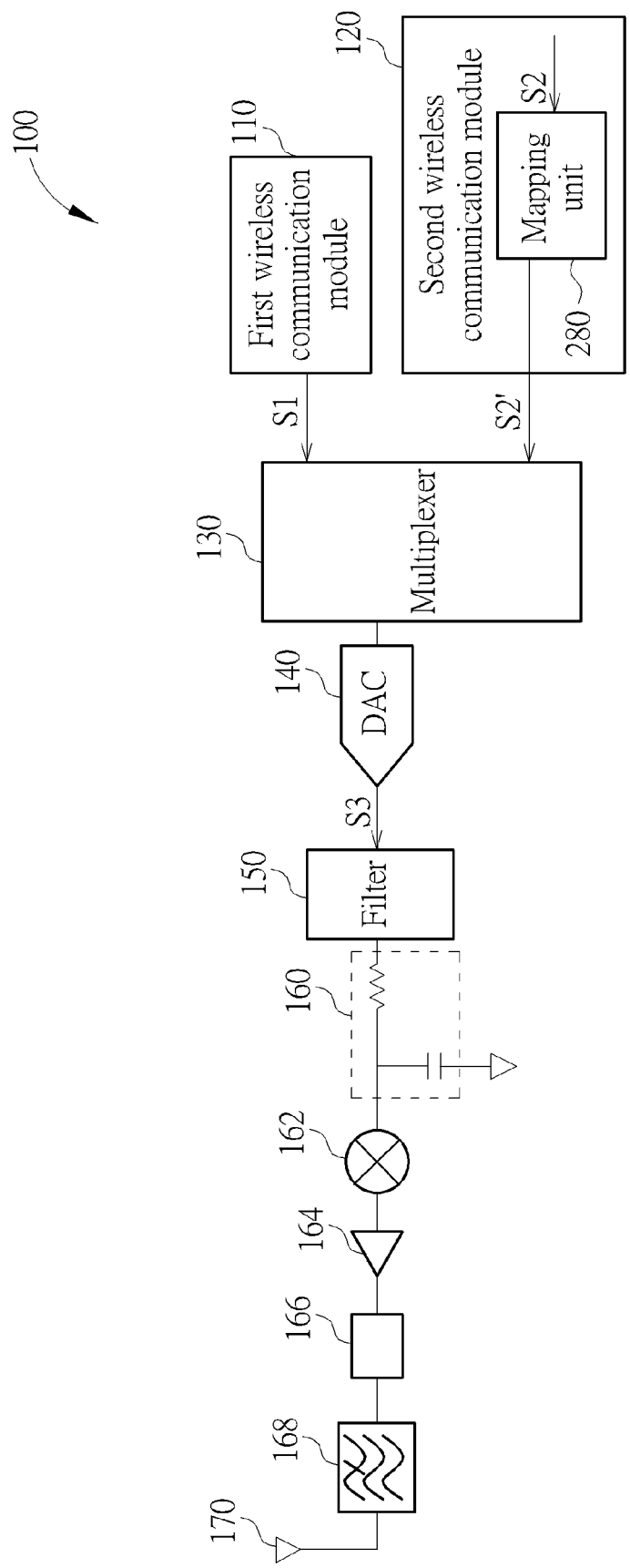
FIG. 2 is a block diagram illustrating a transmitter according to a second embodiment of the present invention.

Please refer to FIG. 2, which is a block diagram illustrating an embodiment of the transmitter 100 according to a second embodiment of the present invention. In this embodiment, the second wireless communication module 120 further includes a mapping unit 280. For example, in this embodiment, the first wireless communication module 110 can be a 10-bit WiFi module and the second wireless communication module 120 can be an 8-bit BT module. In order to share the multiplexer 130 and the DAC 140, the bits of the second wireless communication module 120 are mapped to conform to the bits of the first wireless communication module 110. The mapping unit 280 adds a predetermined bit pattern to the 8-bit digital sample of the second digital signal S2 to convert the 8-bit digital sample into a 10-bit second digital signal S2'. In other words, the mapping operation in this embodiment is implemented with an addition algorithm rather than a multiplication algorithm (that is, rather than simply appending two zero bits '00' to the 8-bit digital sample).

Please refer to TABLE 1, which illustrates an implemented mapping of the present invention. The exemplary table shows mapping an 8-bit BT digital sample to a 10-bit BT digital sample, in order to share the multiplexer 130 with a 10-bit WiFi digital sample, wherein the contents in brackets are their corresponding decimal values.

TABLE 1

| Original 8-bit BT digital sample | 10-bit BT digital sample transformed by the original 8-bit BT digital sample |
|---|---|
| 1111_1111 (255) | 10_0001_1111 (639) |
| 1111_1110 (254) | 10_0001_1110 (638) |
| ... | ... |
| 1000_0000 (128) | 10_0000_0000 (512) |
| ... | ... |
| 0000_0010 (2) | 01_1000_0010 (386) |
| 0000_0001 (1) | 01_1000_0001 (385) |

It can be seen from TABLE 1 that each original 8-bit BT digital sample is added 384 in decimal domain to form a 10-bit BT digital sample. For example, the first to the last (255th) samples of the original 8-bit BT digital sample are "0000_0001," "0000_0010," . . . "1111_1110," "1111_1111." After mapping, the first to the last (255th) samples of the 10-bit BT digital sample transformed from the original 8-bit BT digital sample are "01_1000_0001," "01_1000_0010," . . . "10_0001_1110," "10_0001_1111," which correspond to the binary representations of the decimal values 385 to 639. Please note that, the mapping keeps the median sample (i.e. 1000_0000(128) where 128 is the median of $2^8$) of all possible samples of the 8-bit BT digital sample at the median (i.e. 10_0000_0000(512) where 512 is the median of $2^{10}$) of all possible samples of 10-bit digital samples, and then sequentially maps the samples with larger/smaller values from the median. In other words, the original 8-bit BT digital sample is mapped to conform to the 10-bit WiFi digital sample by arranging the median sample of the original 8-bit BT digital samples to be aligned to the median sample of the 10-bit WiFi digital samples. However, it is merely an example for illustrative purpose. The mapping unit 280 may arrange the median sample of the original 8-bit BT digital samples to be aligned to any sample of the 10-bit WiFi digital samples. That is, the predetermined bit pattern added to the 8-bit digital sample for converting the 8-bit digital sample into a 10-bit digital sample is not limited to correspond to 384 but can be other values. Moreover, the mapping unit 280 is not limited to convert 8-bit samples into 10-bit samples. The bit number of input or output of the mapping unit 280 is configurable based on system design requirements. For example, the first digital signal S1 can be 10-bit while the second digital signal S2 is 9-bit. In this case, however, the mapping will be performed by adding a pattern corresponding to 256 decimal values to the second digital signal S2.

The second digital signal S2' is a 10-bit signal mapped from the 8-bit second digital signal S2. The second signal S2' merely utilizes a portion of the full range of the multiplexer 130 (e.g. 255 (385-639) out of 1023) to transmit data, however, while the first signal S1 has to utilize the full range (e.g.

1023) to transmit data. This results in the current magnitude of the second digital signal S2' being approximately one fourth of the current magnitude of the first signal S1, since the second digital signal S2' utilizes one fourth of the units of the multiplexer. This current reduction benefits the bandwidth design of the first filter 150, which is explained in the following paragraphs.

Figure 3:
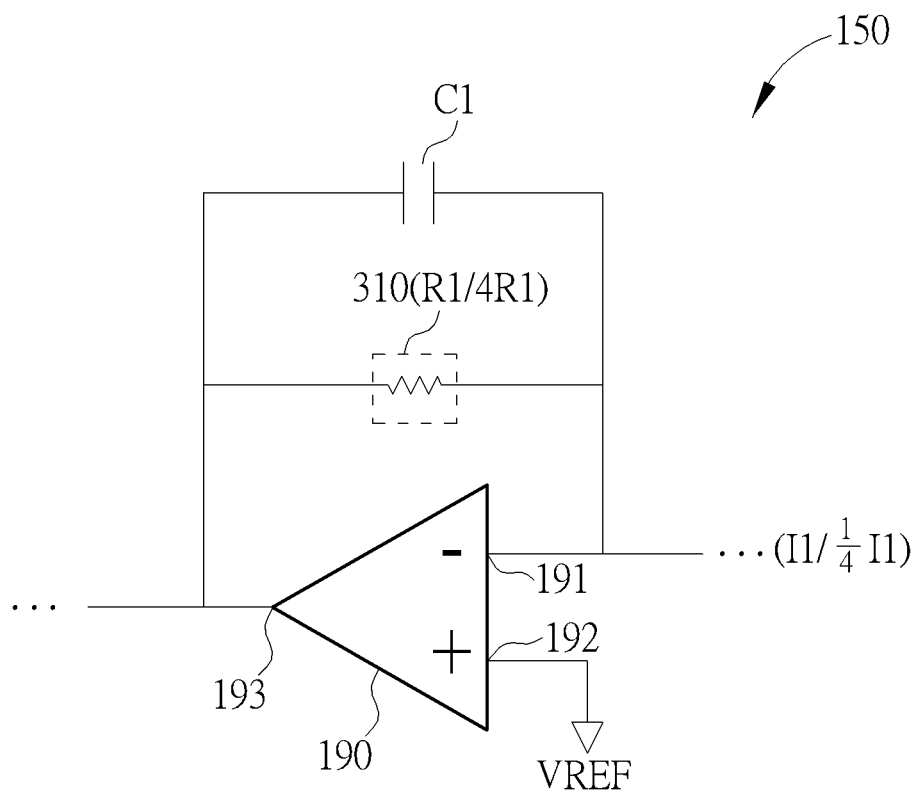
FIG. 3 illustrates the filter in the second embodiment of the present invention.

Please refer to FIG. 3, which illustrates the first filter 150 according to an embodiment of the present invention. In this embodiment, the DAC 140 is a current DAC, and the first filter 150 is a trans-impedance amplifier (TIA) filter. The first filter 150 includes an amplifier 190, an adjustable resistive element (e.g. an adjustable resistor) 310 and a capacitive element (e.g. a capacitor) C1. The amplifier 190 has an inverting input end 191, a non-inverting input 192 end, and an output end 193. The inverting input end 191 is arranged to receive the analog signal S3 transmitted from the DAC 140. The non-inverting input end 192 is arranged to receive a reference voltage VREF. The adjustable resistive element 310 is coupled between the inverting input end 191 and the output end of the amplifier 193, and the capacitive element C1 is also coupled between the inverting input end 191 and the output end 193 of the amplifier 193.

Please refer to the embodiment of FIG. 2 and TABLE 1. In the following example, the first wireless communication module 110 is configured as the 10-bit WiFi module, the second wireless communication module 120 is configured as the 8-bit BT module, and the multiplexer 130 selectively transmits the first digital signal S1 or the second digital signal S2' to the DAC 140. If the communication module 110 is selected as the output source, the resistive element 310 will be adjusted to have a resistance R1, and the inverting end 191 of the amplifier 190 will receive a current value of I1. Hence, the voltage outputted from the output end 193 of the amplifier 190 will be I1×R1. If the communication module 120 is selected as the output source, the resistive element 310 will be adjusted to have a resistance 4R1 which denotes four times the resistance of R1, and the inverting end 191 of the amplifier 190 will receive a current value of $$\frac{1}{4}I1$$

which can be derived from the second embodiment of the present invention. The voltage outputted from the output end 193 of the amplifier 190 will remain the same when the first communication module 110 is selected or when the second communication module 120 is selected, since $$\frac{1}{4}I1 \times 4R1$$

is equal to I1×R1. In general, compared with the WiFi module, the BT module requires narrower bandwidth. Through the above configuration, when the second wireless communication module 120 is selected from the first wireless communication module 110, the resistance of the resistive element 310 becomes 4R1 from R1. The bandwidth of the analog signal S3 will be reduced since the time constant is inversely proportional to the resistance or capacitance of the first filter 150.

In the embodiment where the second digital signal S2 is 9-bit, the mapping unit 280 may add a predetermined pattern corresponding to 256 decimal values to convert 9-bit sample into 10-bit sample, and the current DAC 140 may further intentionally decrease its offset level into half of the original offset level. As a result, the current S3 received by the first filter 150 is still $$\frac{1}{4}I1.$$

Therefore the bandwidth of the first filter 150 remains $$\frac{1}{4R1C1}.$$

All these modifications shall fall within the scope of the present invention.

Figure 4:
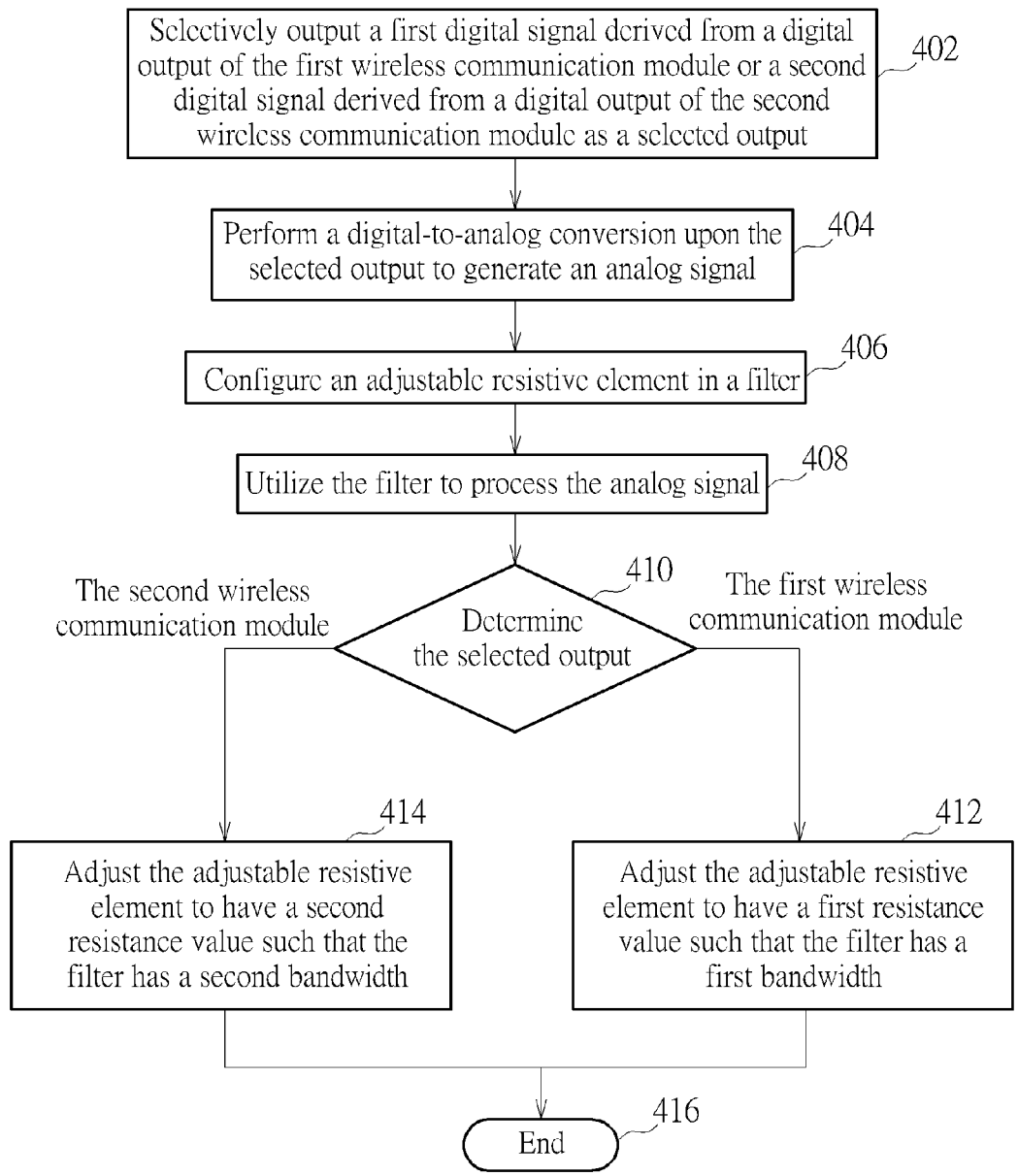
FIG. 4 is a flowchart illustrating a method for operating a transmitter having a first wireless communication module and a second wireless communication module.

Please refer to FIG. 4, which is a flowchart illustrating a method for operating a transmitter having a first wireless communication module and a second wireless communication module. Provided that the result is substantially the same, the steps are not required to be executed in the exact order shown in FIG. 4. The exemplary method may be employed by the transmitter 100 shown in FIGS. 1-2, and can be briefly summarized by the following steps.

Step 400: If the bit number of the digital output of the first wireless communication module is not the same with that of the second wireless communication module, perform a mapping operation on the digital output of the first or second wireless communication module.

Step 402: Selectively output a first digital signal derived from a digital output of the first wireless communication module or a second digital signal derived from a digital output of the second wireless communication module as a selected output.

Step 404: Perform a digital-to-analog conversion upon the selected output to generate an analog signal; and Step 406: Configure an adjustable resistive element in a filter.

Step 408: Utilize the filter to process the analog signal.

Step 410: Determine the selected output: if the selected output is the first wireless communication module, go to step 412; if the selected output is the second wireless communication module, go to step 414.

Step 412: Adjust the adjustable resistive element to have a first resistance value such that the filter has a first bandwidth, then go to step 416.

Step 414: Adjust the adjustable resistive element to have a second resistance value such that the filter has a second bandwidth.

It should be noted that the steps are not required to be executed in the exact order shown in FIG. 4. As a person skilled in the art can readily understand details of each step shown in FIG. 4 after reading the above paragraphs directed to the transmitter 100 shown in FIGS. 1-2, further description is omitted here for brevity.

In view of the above, the present invention provides a novel design of transmitter capable of integrating multiple wireless communication modules. The entire volume of the transmitter can be reduced due to the integrated structure. Since the voltage outputted from the output end 193 of the amplifier 190 will remain the same no matter whether the first communication module 110 or the second communication module 120 is selected, the voltage swing of the transmitter can be reduced. Further, the bandwidth of the transmitter can be reduced when applying a wireless communication module requiring fewer bits, thus reducing the overall power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter, comprising:
   a first wireless communication module;
   a second wireless communication module;
   a multiplexer, arranged for selectively outputting a first digital signal derived from a digital output of the first wireless communication module or a second digital signal derived from a digital output of the second wireless communication module as a selected output;
   a digital-to-analog converter (DAC), coupled to the multiplexer, the DAC arranged for converting the selected output into an analog signal; and
   a filter, coupled to the DAC, the filter arranged to process the analog signal and comprising an adjustable resistive element;
   wherein when the multiplexer selects the first digital signal as the selected output, the adjustable resistive element is adjusted to have a first resistance value such that the filter has a first bandwidth, and when the multiplexer selects the second digital signal as the selected output, the adjustable resistive element is adjusted to have a second resistance value such that the filter has a second bandwidth.

2. The transmitter of claim 1, wherein the first resistance value is larger than the second resistance value and the first bandwidth is smaller than the second bandwidth.

3. The electronic apparatus of claim 1, wherein both the first wireless communication module and the second wireless communication module are operated in a 2.4 GHz Industrial Scientific Medical (ISM) band.

4. The transmitter of claim 1, wherein the DAC is a current DAC, and the filter is a trans-impedance amplifier (TIA) filter comprising:
   an amplifier, having an inverting input end, a non-inverting input end and an output end, wherein the inverting input end is arranged to receive the analog signal, and the non-inverting input end is arranged to receive a reference voltage;
   an adjustable resistive element, coupled between the inverting input end and the output end of the amplifier; and
   a capacitive element, coupled between the inverting input end and the output end of the amplifier.

5. The transmitter of claim 1, wherein the digital output of the first wireless communication module is an N-bit digital sample, the digital output of the second wireless communication module is an M-bit digital sample, and N and M are different positive integers.

6. The transmitter of claim 5, wherein N is larger than M, and the transmitter further comprises:
   a mapping unit, arranged for adding a predetermined bit pattern to the M-bit digital sample to convert the M-bit digital sample into the second digital signal having N bits.

7. The transmitter of claim 6, wherein a decimal value of a median sample of all possible samples of the second digital signal having N bits is equal to a decimal value of a median sample of all possible samples of the N-bit digital sample.

8. A method for operating a transmitter having a first wireless communication module and a second wireless communication module, comprising:
   selectively outputting a first digital signal derived from a digital output of the first wireless communication module or a second digital signal derived from a digital output of the second wireless communication module as a selected output;
   performing a digital-to-analog conversion upon the selected output to generate an analog signal; and
   adjusting an adjustable resistive element in a filter, and utilizing the filter to process the analog signal, wherein when the selected output is the first digital signal, the adjustable resistive element is adjusted to have a first resistance value such that the filter has a first bandwidth, and when the selected output is the second digital signal, the adjustable resistive element is adjusted to have a second resistance value such that the filter has a second bandwidth.

9. The method of claim 8, wherein the first resistance value is larger than the second resistance value and the first bandwidth is smaller than the second bandwidth.

10. The method of claim 8, further comprising:
    operating both the first wireless communication module and the second wireless communication module in a 2.4 GHz Industrial Scientific Medical (ISM) band.

11. The method of claim 8, wherein the digital output of the first wireless communication module is an N-bit digital sample, the digital output of the second wireless communication module is an M-bit digital sample, and N and M are different positive integers.

12. The method of claim 11, wherein N is larger than M, and the method further comprises:
    adding a predetermined bit pattern to the M-bit digital sample to convert the M-bit digital sample into the second digital signal having N bits.

13. The method of claim 12, wherein a decimal value of a median sample of all possible samples of the second digital signal having N bits is equal to a decimal value of a median sample of all possible samples of the N-bit digital sample after adding the predetermined bit pattern to the M-bit digital sample.

14. A transmitter, comprising:
    a first wireless communication module;
    a second wireless communication module comprising a mapping unit;
    a multiplexer, arranged for selectively outputting a first digital signal derived from a digital output of the first wireless communication module or a second digital signal derived from a digital output of the mapping unit of the second wireless communication module as a selected output;
    a DAC, coupled to the multiplexer, the DAC arranged for converting the selected output into an analog signal; and
    a filter, coupled to the DAC, the filter arranged to process the analog signal and a bandwidth of the filter is adjusted according to the selected output.

15. A transmitter, comprising:
    a first wireless communication module;
    a second wireless communication module;
    a multiplexer, arranged for selectively outputting a first digital signal derived from a digital output of the first wireless communication module or a second digital signal derived from a digital output of the second wireless communication module as a selected output;
    a DAC, coupled to the multiplexer, the DAC shared between the first and second wireless communication modules, and arranged for converting the selected output into an analog signal; and a filter, coupled to the DAC, the filter shared between the first and second wireless communication modules, and arranged to process the analog signal.

* * * * *